Oct. 26, 1965  S. SCHULHOFF, SR  3,213,673
SEALING PADS FOR USE IN CAN TESTING MACHINES
Filed Feb. 13, 1962
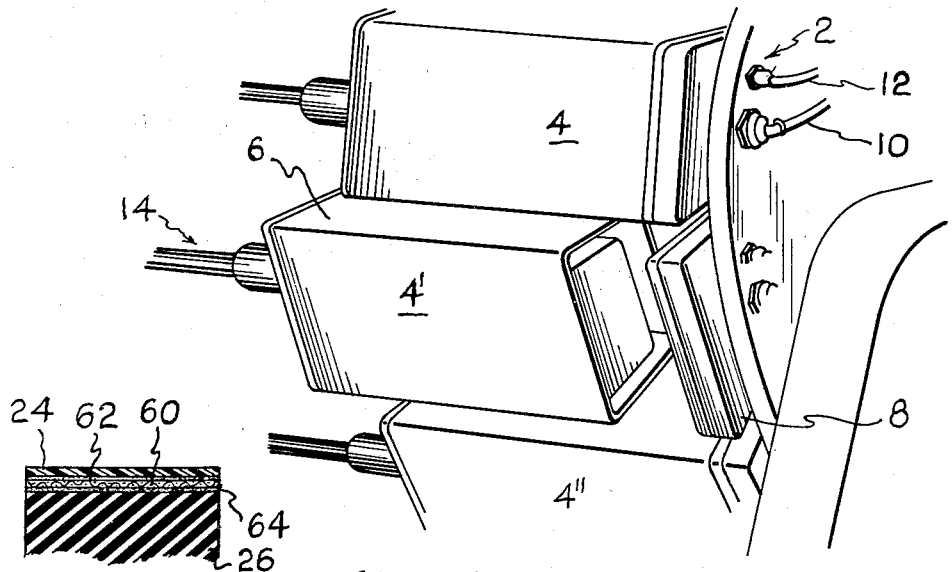
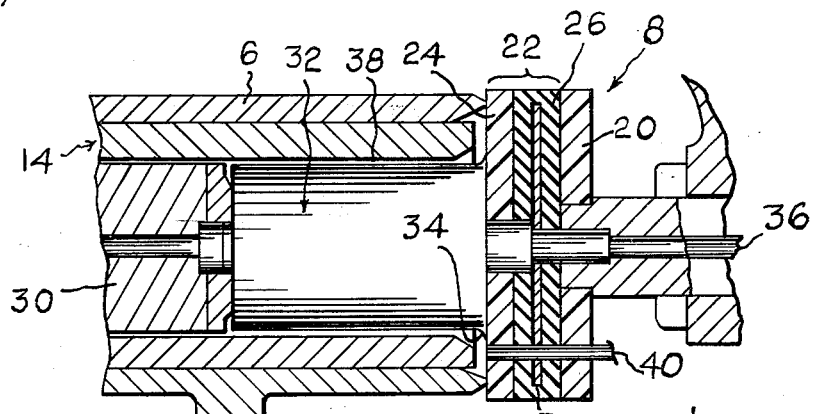
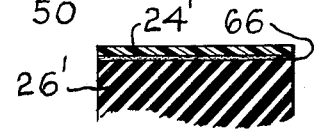
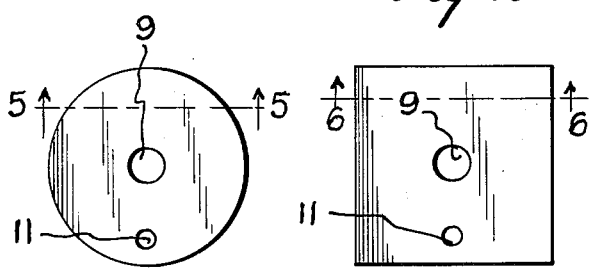
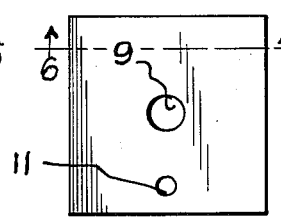
SAUL SCHULHOFF, SR
INVENTOR.
BY Jacobi & Davidson
ATTORNEYS.

3,213,673
SEALING PADS FOR USE IN CAN TESTING MACHINES
Saul Schulhoff, Sr., Highland Station, Baltimore, Md.
Filed Feb. 13, 1962, Ser. No. 172,922
13 Claims. (Cl. 73—49.2)

This invention relates to equipment for testing containers for fluid leaks in the seams thereof, and more particularly to sealing pads for use in machines which are commonly known in the trade as "can testers."

After certain types of containers have been formed, such as for example, metal cans or the like, it is necessary and/or desirable to test seams formed therein for fluid leakage. The seams tested can comprise either the side seam or the bottom seam, or both depending on the particular type of container involved.

As well known to those of ordinary skill in the art, for purposes of making the "leak" tests, it is common to test a container which is closed at one end, and open at the other end. The testing operation carried out on containers of such type includes the step of moving a closing member into sealing relation with the open end of the container, and thereafter forcing fluid, normally in gaseous form, under pressure into the container. The testing area in a conventional form of machine for performing the testing operation is within an outer jacket, and the space between the container or can under test and the jacket is initially maintained at a predetermined pressure. Once the testing operation starts, and the fluid under pressure is injected within the container under test, then if leaks exist, there is a pressure variant in the space between the container and the surrounding jacket. This pressure variant is detected by a suitable transducer means, and normally used for purposes of initiating an ejection operation.

Testing machines which operate in the general manner outlined above, must incorporate some type of suitable sealing pad which engages the open end of the container under test prior to the entry therein of fluid under pressure. The pad effectively serves as a seal about the open end, and in many instances also serves to seal the surrounding jacket closed. Various types of pads which can be used to perform the necessary sealing operation or operations, as the case may be, have heretofore been suggested. In the normal instance, such pad comprises a rubber body suitably dimensioned for use in the particular testing machine, and adapted to cooperate with some securing means, such as bolts, for purposes of maintaining the pad in proper operational position.

Although testing machines of the general type described above have proved satisfactory over the years, and although sealing pads constructed in accordance with the preceding discussion have been universally used in such machines, certain problems are encountered with the sealing pads, particularly where the ends of containers being tested are highly abrasive on the sealing pad, and where the containers are formed from light gauge metal which can be easily deformed or distorted.

In order to compensate for abrasive properties, and in order to assure a tight seal in instances where light gauge metal is used without any distortion of the container itself, the pad should possess particular resilient characteristics, as well as particular abrasion resistant characteristics.

If the pads do not possess the necessary characteristics, and for example, the abrasion resistance is low, then the pads must be replaced at comparatively short intervals. The replacement presents a serious problem with the conventional type of pad because it requires stopping the machine for prolonged periods, unbolting the pad supports and pads themselves, and thereafter installing the new pads. The problem becomes more complex in instances where a highly resilient pad must be used, because with conventional techniques, the increase in resiliency results in a decrease in abrasion resistance. Specifically, sealing pads of the type in question have been heretofore generally formed from rubber. In order to increase the wear-resistance of the pads, zinc oxide or carbon black has been added to the rubber compounds, but these additional ingredients tend to harden the pad, and thus prevent its use effectively in connection with light gauge metals which are easily subject to distortion during the testing operation. On the other hand, to provide for the desired resiliency or softness, "rubber softener ingredients" must be added, and as is well known in the trade, these ingredients tend to destroy or substantially impair the abrasion resistance of the pad.

Thus, it is difficult, if not virtually impossible, to form a pad in a conventional manner by adding ingredients thereto so as to achieve an ultimate product which possesses the necessary resilient characteristics, as well as the desirable abrasion resistance characteristics. Realizing this difficulty, as well as the problem encountered with respect to loss of time required in changing existing sealing pads of the type in question, the present invention has as its primary object the provision of a sealing pad which possesses the necessary resiliency characteristics, as well as the necessary abrasion resistant characteristics, and which in addition allows for operating can testing machines with a minimum of break-down time in instances where the container engaging face of the sealing pad used therein becomes abraded. Still further, and most important, the invention has as another of its primary objects the provision of such an improved pad, which pad can be made available to the user at a comparatively inexpensive price.

Although the invention has been discussed above, as related to the provision of a sealing pad for a machine adapted to test containers for fluid leaks, it is to be understood at the outset that the invention lies in a method of operating such a machine, as well as in the combination of the sealing pad provided hereby with a machine of the aforesaid type.

In accordance with the basic aspects of the invention, the user would initially install in the can testing machine a pad having a base section and a container engaging face section detachably adhesively secured to the base section. The face section in possible contrast with the base section, has the desired resiliency and abrasion resistant characteristics.

After installing such pad, the machine would be operated, and as indicated above, the natural result would be abrasion of the container engaging face section by the ends of containers under test. However, this abrasion would be slow by virtue of the type of face section used.

When, however, the slow abrasion reached a point where the efficiency of the machine was no longer maintained, then the machine would be stopped, and the operator, while maintaining the base section of the pad in position in the machine, would remove the container engaging face section and detachably adhesively secure another container engaging face section on the base section of the pad. In effect, the container engaging face section would be "peeled-off" of the base section, and a new container engaging face section would be adhesively affixed thereon. Then the machine would again be ready for operation.

While the pad provided hereby possesses certain preferred characteristics, in a basic sense, as should be apparent from the preceding discussion, such pad generally comprises a resilient base section, a resilient container engaging face section, and means for detachably adhesively securing the sections in laminated relation. Moreover, preferably container engaging face sections are produced as individual and separate components provided with a suitable pressure sensitive adhesive on one face thereof, and shipped with a protective sheet covering the adhesive layer. The protective sheet can be easily removed at the time of installation of the component as required.

The invention will be better understood, and objects other than those specifically set forth above will become apparent, when consideration is given to the following detailed description of the illustrative and preferred embodiments hereof. Such description makes reference to the annexed drawings, wherein:

FIGURE 1 is a fragmental perspective view of an exemplary form of machine adapted to test containers for fluid leaks;

FIGURE 2 is a side cross-sectional view of a testing station of the machine shown in FIGURE 1;

FIGURE 3 is a plan view of one form of sealing pad constructed in accordance with the instant invention;

FIGURE 4 is a plan view of a modified form of sealing pad constructed in accordance with the instant invention;

FIGURE 5 is a sectional view taken on the line 5—5 of FIGURE 3; and

FIGURE 6 is a sectional view taken on the line 6—6 of FIGURE 4.

If specific reference is now made to the drawings, and in particular to FIGURE 1, it will be noted that part of an operating section of a can testing machine is shown therein and generally designated by the numeral 2. Such section of the machine includes a plurality of can testing stations 4, 4', and 4", as illustrated. Each station comprises a jacket housing 6 in the form of an enclosed casing, and an end closing mechanism 8. Suitable fluid inlet lines and outlet lines, 10 and 12, are associated with each station, as is a reciprocating piston arrangement generally designated by the numeral 14. The details of construction of the overall machine form no part of the instant invention, and the same is illustrated merely for purposes of enabling a complete comprehension of the invention. For further details as to the exact operation, attention is directed to the publication of E. W. Bliss Company, Container Machinery Division, Hastings, Michigan, entitled Bliss Automatic Can Tester, bearing publication number 500-1-61, and to the publication of the same company entitled Bliss Automatic Can Tester bearing publication number IM 8-59.

As shown in FIGURE 2, the end closing mechanism 8 of an apparatus of the type under consideration normally includes a base plate 20 carrying thereon a sealing pad. A sealing pad constructed in accordance herewith is designated by the numeral 22, and includes a can engaging face section 24 and a base section 26. As shown, the base section lies adjacent the pad base plate 20, whereas the can engaging face section is disposed at the forward end of the closing mechanism 8.

In operation, quite generally, the jacket 6 is moved to the position shown in FIGURE 2, and simultaneously therewith a piston 30 which is part of the piston arrangement 14 forces the container under test, here designated by the numeral 32, to move to the right as shown whereby the lip 34 of the container engages the forward face of pad section 24. The jacket 6 also engages the forward face of section 24, but in spaced relation to the lip 34 of the container 32.

After the parts have been moved by the operating mechanisms to the position shown in FIGURE 2 the, for example, fluid under pressure is introduced through the inlet line 36. This fluid passes within the container, and if there are no leaks therein, the space 38 between the outside of the container 32 and the inside of the jacket 6 has a predetermined pressure. If, however, the can under test leaks, then the pressure in the area 38 is increased, and the increase in pressure results in an increase in pressure in the detecting tube 40. Such increase in pressure, in accordance with conventional practice, is used to operate an ejection mechanism.

While only one operation has been generally described above, it is to be understood that the conventional can testing machine operates cycle after cycle with container after container. Each container under test in a particular station abrades the forward face of the pad section 24 to a certain extent, and eventually the abrasion results in inefficiency. If the pad is constructed as an integral unit, as opposed to comprising separate sections as provided hereby and explained more fully below, then the complete pad must be replaced when the abrasion results in inefficiency. As suggested above, although not specifically shown in the drawings, the replacement requires an unbolting normally, and thus results in a substantial loss of time.

Now having understood the general environment of use of the instant invention, attention can be more fully directed to the sealing pad provided hereby. First, as noted above, the invention contemplates forming the pad as separate sections, such as the sections 24 and 26 shown in FIGURE 2. The base section 26 preferably, and in conformance with existing techniques, has imbedded therein a stiffening plate 50 which can be made of any suitable metal. Moreover, the base section is attached to the base member of the end closing mechanism 8 by any suitable means of conventional design, and the particular manner in which the base section is secured on the base member 20, forms no part of the instant invention.

However, the manner in which the section 24 of the pad is secured to the section 26 constitutes an important feature hereof. Preferably, the section 24, as shown in FIGURE 5, carries on one face thereof, means for detachably adhesively securing the sections in laminated relation. In the embodiment of FIGURE 5, this means includes a base layer 60 of fabric, for example, having pressure sensitive adhesive layers 62 and 64 carried on opposed faces thereof. The adhesive layer 62 securely bonds to the underside of the can engaging face section 24, whereas the adhesive layer 64 bonds between the base layer 60 and the base section 26 of the pad. By virtue of the incorporation of the base layer having opposite faces thereof coated with pressure sensitive adhesive, the can engaging face section is securely affixed to the pad base section. However, in the event the can engaging face section becomes severely abraded so as to interfere with efficient operation of the machine, then the face section can be easily peeled from the base section and a new face section can be inserted.

From the foregoing discussion, one of the basic concepts of the instant invention, namely the provision of a peelable face sealing pad for can testing machines should be fully appreciated. However, the true significance of the invention does not only involve such phase, but in addition centers about the operating characteristics of the material from which the sealing pad hereof is formed.

As suggested at the outset of this specification, the utilization of rubber sealing pads, as heretofore contemplated, results in certain disadvantages due to the fact that when certain ingredients are added to afford abrasion resistance, they destroy compressibility. On the other hand, when ingredients are added to improve the compressibility characteristics, these latter-mentioned ingredients tend to destroy the abrasion resistance properties. Thus, any pad formed from conventional material represents a compromise. The instant invention eliminates some of the compromise problems, however. Specifically, if conventional materials are used to form a separate section pad as provided hereby, then when the abrasion does interfere with the machine operation, the can engaging face section can be peeled from the base section, and replaced with a minimum of waste.

Notwithstanding the advantage of the invention as applied to pads formed by conventional materials, the invention further contemplates the provision of a pad formed so as to permit greater wear in normal operation. In this connection, the invention realizes the advantages which are afforded by certain durable plastics, such as, for example, polyurethanes, and still further, realizes the normal impracticability of forming an entire sealing pad from a durable plastic such as polyurethane because of the increased expense involved in using the plastic material.

With full appreciation of the foregoing factors, the invention affords an improved sealing pad which is not unduly expensive, but which in effect possesses all of the advantages of a pad formed in its entirety from a more durable plastic such as polyurethane. Specifically, in accordance with the preferred embodiment hereof, the base section 26 of the pad is formed from some inexpensive material having a suitable compressibility as explained more fully below. On the other hand, the can engaging face section of the pad is formed from a different material, such as, preferably a polyurethane, which possesses the desired abrasion resistance as well as the desired compressibility characteristics. Thus, the ultimate pad is inexpensive in use because the can engaging face section is comparatively thin with respect to the base section, as well as constituting a minor fractional part of the volume of the pad as shown in FIGURES 5 and 6, and a substantial quantity of material is not required for forming the can engaging face section of the pad hereof.

The base section of the preferred pad is formed of, for example, a gum rubber which has a Shore hardness of 45 or above. On the other hand, the can engaging face section is formed from a suitable plastic having a good abrasion resistance and a Shore hardness of between 10 and 30, but preferably approximately 20. The term "Shore hardness" is recognized in the trade, but for purposes of completeness, it is to be understood that the term is used herein to refer to a measurement made with a Shore gauge "A" as produced by Shore Instrument Company.

With the preferred pad unit hereof, the abrasion resistance of the base section of the pad can be less than the abrasive resistance of the can engaging face section of the pad, so as to permit use of cheaper material therefor. Moreover, as indicated by the Shore hardnesses set forth above, the coefficient of compressibility of the base section of the pad is greater than the coefficient of compressibility of the can engaging face section of the pad, also permitting use of cheaper materials. More important, however, is the fact that with the pad hereof, the desired compressibility and abrasion resistance can be provided in the can engaging face section whereby to achieve efficiency in operation even when highly abrasive light gauge containers are tested. Of course, the base section would possess the desired resiliency for any operation, but the required characteristics thereof are less stringent.

The thickness of the base section of a pad provided hereby may be varied as required for the particular machine, but the invention contemplates forming the can engaging face sections with a thickness of between preferably one-eighth and one-fourth inch, or at least less than one-half inch.

While it has been specifically suggested hereinabove that the adhesive securing between the can engaging face section and the base section of the pad is achieved through a double face pressure sensitive layer, a modification of the invention, as shown in FIGURE 6, contemplates forming an adhesive coating directly on the underside of the can engaging face section 24. Specifically, in FIGURE 6 the can engaging face section is designated by the numeral 24′ and is shown as carrying an adhesive coating 66 directly affixed thereto. This coating in turn secures the can engaging face section 24′ to the base section 26′ of the pad.

Regardless of the type of adhesive means used for purposes of achieving the desired securing, it will be understood that can engaging face sections of the pad can be shipped as individual units. Thus, a user of the pads would, for example, use a certain number of base sections, and a substantially greater number of can engaging face sections. Once the base section was installed, the same would be used in operation after operation, but the can engaging face sections could be replaced as required. To facilitate handling of the can engaging face sections the invention provides for utilizing a protective sheet over the adhesive coating exposed on the underside thereof. Specifically, a suitable protective sheet, of any of the various types now well-known, would be applied either over the exposed face of the coating 66 of the unit of FIGURE 6, or over the exposed face of the coating 64 of the unit of FIGURE 5. When it was desired to place the can engaging face section in position, the protective sheet would be peeled therefrom, and the can engaging face section secured in operative position over an associated base section.

Of course, as should be apparent from the drawings, the pads would necessarily be provided with certain apertures or passageways such as indicated in FIGURES 3 and 4 by the numerals 9 and 11, which passageways permit the proper introduction and withdrawal of fluid from within the confines of a testing station. These apertures would be formed in the pads prior to shipment to the user under normal circumstances, so that the pads could merely be installed on the machine. However, if desired, the user could form the apertures. In any instance, the apertures would be provided so as to properly receive the associated components, or be aligned therewith for operational purposes.

After reading the foregoing detailed description of the preferred and illustrative embodiments of the invention, as well as the method of operation thereof, it should be apparent that the objects set forth at the outset of the present specification have been successfully achieved.

What is claimed is:

1. A sealing pad for use in a machine adapted to test containers for fluid leaks, said pad comprising a resilient base section and a resilient container engaging face section detachably adhesively secured in laminated relation to said base section, said resilient container engaging face section having a thickness which is a small fraction of the thickness of said base section, said resilient container engaging face section being formed of a first material having an abrasion resistance greater than the abrasion resistance of a second material from which said base section is formed when said first and second materials have equivalent coefficients of resiliency.

2. A sealing pad as defined in claim 1 wherein said base section is formed of said second material having a Shore hardness of substantially 45 or greater, and wherein said container engaging face section is formed of said first material having a Shore hardness of between 10 and 30.

3. A sealing pad as defined in claim 2 wherein said container engaging face section is formed of said first material having a Shore hardness of substantially 20.

4. A sealing pad for use in a machine adapted to test containers for fluid leaks, said pad comprising a resilient container engaging face section and a resilient base section, one end face of one of said sections carrying a pressure sensitive adhesive coating detachably securing said end face to an end face of the other of said sections to maintain said sections in laminated relation, said container engaging face section being formed of a first material having a greater abrasion resistance than a second material from which said base section is formed when said first and second materials have equivalent coefficients of resiliency.

5. A sealing pad as defined in claim 4 wherein said container engaging face section has a thickness which is a small fraction of the thickness of said base section, said resilient container engaging face section constituting a minor fractional part of the volume of said sealing pad, and wherein said container engaging face section carries said pressure sensitive adhesive coating.

6. A sealing pad as defined in claim 4 wherein said first material for said container engaging face section is formed of urethane.

7. A sealing pad for use in a machine adapted to test containers for fluid leaks, said pad comprising a base section and a container engaging face section, said base section having a greater coefficient of compressibility than said container engaging face section, said container engaging face section having a greater abrasion resistance than said base section, at least one end face of one of said sections carrying a pressure sensitive adhesive coating detachably securing said end face to an end face of the other of said sections to maintain said sections in laminated relation.

8. A container engaging face section unit for a sealing pad of a machine adapted to test containers for fluid leaks, said unit comprising a urethane body having opposed planar faces and a thickness of less than one-half inch, pressure sensitive adhesive means securing said section in position, and a protective sheet member detachably adhered over said adhesive means to normally protect said adhesive means, and upon detaching of said sheet member, to permit securing said body in position by said adhesive means.

9. A container engaging face section unit as defined in claim 8 wherein said urethane body has a thickness of between one-eighth and one-fourth inch.

10. A method of providing continuously operable sealing pads in a machine adapted to test containers for fluid leaks, said method comprising the steps of initially installing in said machine a pad having a base section and a container engaging face section detachably adhesively secured to said base section, operating said machine whereby said container engaging face section is abraded by contact with containers, then stopping said machine, then while maintaining said base section in position in said machine, removing said container engaging face section for said base section and detachably adhesively securing another container engaging face section on said base section, then repeating sequentially said operating, stopping, removing and securing steps.

11. In combination with a machine adapted to test containers for fluid leaks and including means for sealing a can end, a sealing pad comprising a resilient base section, a resilient container engaging face section, and means for detachably adhesively securing said sections in laminated relation.

12. A sealing pad for use in a machine adapted to test containers for fluid leaks, said pad comprising a resilient base section, a thin resilient container engaging face section, and means for detachably adhesively securing said sections in laminated relation, said resilient container engaging face section constituting a minor fractional part of the volume of said sealing pad, and having a greater abrasion resistance than that of said base section.

13. A sealing pad as defined in claim 12 wherein said means for detachably adhesively securing said sections in laminated relation comprises a base layer having opposite faces thereof coated with pressure-sensitive adhesive.

References Cited by the Examiner

UNITED STATES PATENTS

| | | | |
|---|---|---|---|
| 2,407,062 | 9/46 | Darrah | 73—41 X |
| 2,606,657 | 8/52 | Berthelsen | 73—45.1 X |
| 2,646,677 | 7/53 | Kubaugh | 73—49.2 |
| 2,696,107 | 12/54 | Blaine-Leisk | 73—45.2 |
| 2,901,906 | 9/59 | Emmons | 73—37 |
| 2,927,805 | 3/60 | Faccou | 285—16 X |
| 3,021,250 | 2/62 | La Voie | 117—68.5 X |

ISAAC LISANN, *Primary Examiner.*